United States Patent
Koolen et al.

(10) Patent No.: US 11,351,877 B2
(45) Date of Patent: Jun. 7, 2022

(54) ELECTRICAL VEHICLE CHARGING SYSTEM FOR CHARGING AN ELECTRICAL VEHICLE

(71) Applicant: ABB Schweiz AG, Baden (CH)

(72) Inventors: Gertjan Koolen, Eindhoven (NL); Jim Van-Der-Heijden, Eindhoven (NL); Stefan Raaijmakers, Delft (NL)

(73) Assignee: ABB Schweiz AG, Baden (CH)

( * ) Notice: Subject to any disclaimer, the term of this patent is extended or adjusted under 35 U.S.C. 154(b) by 36 days.

(21) Appl. No.: 17/101,010

(22) Filed: Nov. 23, 2020

(65) Prior Publication Data
US 2021/0070184 A1    Mar. 11, 2021

Related U.S. Application Data

(63) Continuation of application No. PCT/EP2019/063251, filed on May 22, 2019.

(30) Foreign Application Priority Data

May 24, 2018  (EP) ...................................... 18174138

(51) Int. Cl.
*B60L 53/18*    (2019.01)
*B60L 53/302*   (2019.01)
(Continued)

(52) U.S. Cl.
CPC ............... *B60L 53/18* (2019.02); *B60L 53/11* (2019.02); *B60L 53/16* (2019.02); *B60L 53/302* (2019.02); *B60L 53/305* (2019.02)

(58) Field of Classification Search
CPC ...................................................... B60L 53/18
(Continued)

(56) References Cited

U.S. PATENT DOCUMENTS 10,274,532 B1 *   4/2019   Smith ..................... B60R 16/03
2011/0207358 A1 * 8/2011   Ichikawa ................ B60L 50/61
                                                    439/502
(Continued)

FOREIGN PATENT DOCUMENTS

JP    2001208783 A    8/2001
JP    2011015581 A    1/2011

OTHER PUBLICATIONS

SAE International, "SAE Electric Vehicle and Plug in Hybrid Electric Vehicle Conductive Charge Coupler", Oct. 2017, pp. 1-116, SAE International, Warrendale, PA, USA.

*Primary Examiner* — Jerry D Robbins
(74) *Attorney, Agent, or Firm* — Leydig, Voit & Mayer, Ltd.

(57) ABSTRACT

An electric vehicle charging equipment (EVSE) system is provided. The EVSE system delivers direct current (DC) charging power and is configured for delivering electrical energy to a single electrical vehicle at a same time. The EVSE system comprises a plurality of charging cables with respective charging connectors for connecting to a respective plurality of electrical vehicles. At least one of the plurality of charging cables is liquid cooled and each of the plurality of charging cables comprises at least two DC power lines and at least two signal lines, which are each connected to a respective DC power line within the charging connector. The EVSE system further comprises a DC metering device configured for measuring, via the at least two signal lines, a connector voltage between the at least two DC power lines within the charging connector.

17 Claims, 1 Drawing Sheet

(51) Int. Cl.
  *B60L 53/10* (2019.01)
  *B60L 53/30* (2019.01)
  *B60L 53/16* (2019.01)
(58) Field of Classification Search
  USPC .......................................................... 320/104
  See application file for complete search history.

(56) References Cited

U.S. PATENT DOCUMENTS

| | | |
|---|---|---|
| 2015/0217654 A1 | 8/2015 | Woo et al. |
| 2017/0028862 A1 | 2/2017 | Nagel et al. |
| 2018/0075946 A1 | 3/2018 | Beimdieck et al. |
| 2019/0221330 A1* | 7/2019 | Fuehrer ................. G01R 27/16 |
| 2019/0280436 A1* | 9/2019 | Stross ................... B60L 53/305 |
| 2019/0360873 A1* | 11/2019 | Zoon ..................... H02H 7/226 |

* cited by examiner

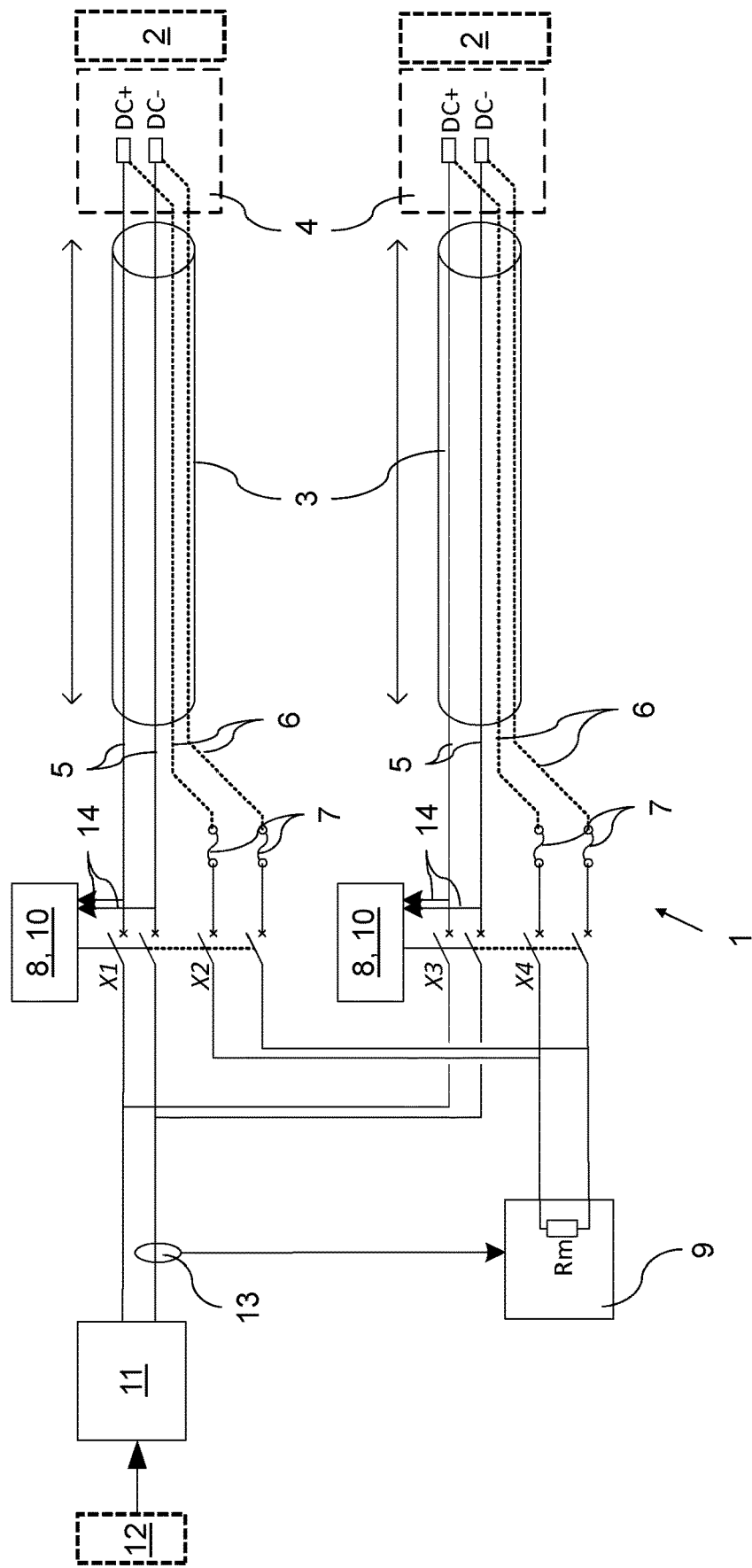

ELECTRICAL VEHICLE CHARGING SYSTEM FOR CHARGING AN ELECTRICAL VEHICLE

CROSS-REFERENCE TO PRIOR APPLICATION

This application is a continuation of International Patent Application No. PCT/EP2019/063251, filed on May 22, 2019, which claims priority to European Patent Application No. EP 18174138.0, filed on May 24, 2018. The entire disclosure of both applications is hereby incorporated by reference herein.

FIELD

The invention relates to an electric vehicle charging equipment, EVSE, configured for delivering electrical energy to a single electrical vehicle at the same time, whereby the EVSE comprises a plurality of liquid cooled charging cables with respective charging connectors for connecting to a respective plurality of electrical vehicles, whereby each charging cable comprises at least two direct current, DC, power lines. The invention further relates to a method for measuring a connector voltage at a charging connector, comprising an electric vehicle charging equipment, EVSE, configured for delivering electrical energy to a single electrical vehicle at the same time, wherein the EVSE comprises a plurality of liquid cooled charging cables with respective charging connectors for connecting to a respective plurality of electrical vehicles.

BACKGROUND

Electric vehicle, EV, direct current, DC, fast charging methods and systems often use a so called Combined Charging System, CCS, protocol according to International Electrotechnical Commission (IEC) 61851-23 and Society of Automotive Engineers (SAE) J1772 standard for charging electrical vehicles both in the United States, US, and in the European Union, EU.

As charge currents increase, liquid cooled charging cables for connecting an Electric Vehicle Supply Equipment, EVSE, via a charging connector with the electrical vehicle are becoming more commonly used. The liquid cooling allows conductors within the charging cable to become thinner, and thereby less stiff and easier to use, because excessive heat due to high charging currents and charging cable internal resistances is taken care of. However, such cooling increases energy losses in the charging cable.

In recent days precise energy metering for DC EV charging has become a requirement in many countries. For instance, Germany already requires such precise metering, as defined by the REA 6A specification, while the US has similar requirements defined by the expected National Institute of Standards and Technology (NIST) hb44 update. According to these requirements, a measurement accuracy of 1% for the US and 3.5% for Germany has to be achieved of the electrical power delivered at the charging connector.

However, these two trends conflict with each other, since extra charging cable losses are in scope of a certifiable energy metering solution as required by said specifications.

SUMMARY

In an embodiment, the present invention provides an electric vehicle charging equipment (EVSE) system, the EVSE system delivers direct current (DC) charging power and is configured for delivering electrical energy to a single electrical vehicle at a same time, wherein the EVSE system comprises: a plurality of charging cables with respective charging connectors for connecting to a respective plurality of electrical vehicles, wherein at least one of the plurality of charging cables is liquid cooled and wherein each of the plurality of charging cables comprises at least two DC power lines and at least two signal lines, which are each connected to a respective DC power line of the at least two DC power lines within the charging connector; and a DC metering device configured for measuring, via the at least two signal lines, a connector voltage between the at least two DC power lines within the charging connector.

It is therefore an object of the invention to provide a precise energy metering possibility for DC EV charging that fulfils the before discussed requirements.

The object of the invention is solved by the features identified and discussed below. Preferred embodiments are also detailed and discussed below.

Thus, the object is solved by an electric vehicle charging equipment, EVSE, delivering DC charging power and configured for delivering electrical energy to a single electrical vehicle at the same time, whereby the EVSE comprises a plurality of charging cables with respective charging connectors for connecting to a respective plurality of electrical vehicles, whereby at least one of the charging cables is liquid cooled and whereby each charging cable comprises at least two DC power lines and at least two signal lines, which are each connected to a respective DC power line within the charging connector, and a DC metering device configured for measuring, via the at least two signal lines, a connector voltage between the two DC power lines within the charging connector.

The object is further solved by a method for measuring a connector voltage at a charging connector, comprising an electric vehicle charging equipment, EVSE, delivering DC charging power and configured for delivering electrical energy to a single electrical vehicle at the same time, wherein the EVSE comprises a plurality of charging cables with respective charging connectors for connecting to a respective plurality of electrical vehicles, whereby at least one of the charging cables is liquid cooled and whereby each charging cable comprises at least two DC power lines and at least two signal lines, which are each connected to a respective DC power line within the charging connector, and the method comprises the step:

Measuring, via the at least two signal lines, the connector voltage between the two DC power lines within the charging connector.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows an example implementation of an electric vehicle charging equipment, EVSE, according to a preferred embodiment of the invention in a schematic view.

DETAILED DESCRIPTION

It is therefore a key point of the invention that cable losses of the charging cable are accounted for, as the connector voltage is measured within the charging connector. Such a solution is opposite to prior art implementations, where the voltage is measured at charge post terminals only i.e. at an end of the charging cable opposite to the charging connectors. Thus, the proposed solution considers any voltage drop respectively resulting energy loss in the charging cable. Such way the proposed solution allows precise metering as required by the German REA 6A specification or the upcoming US NIST hb44 update, with a measurement accuracy of 1% for the US and 3.5% for Germany for the electrical power delivered within the charging connector. In parallel, the liquid cooling allows using thinner DC power lines, as excessive heat due to the high charging currents and charging cable internal resistances is taken care of, thereby providing an advantageous solution to the before discussed dilemma.

Generally, the electric vehicle supply equipment, EVSE, also referred to as electric vehicle charging station, EV charging station, electric recharging point, charging point and charge point, is an element in an infrastructure that supplies electric energy for the recharging of electric vehicles, such as plug-in electric vehicles, including electric cars, neighborhood electric vehicles and plug-in hybrids. Preferably, each one signal line is associated to each one DC power line. Further preferably, the signal lines run parallel and/or adjacent to the DC power lines. Preferably, the signal lines run at least a distance parallel to the DC power lines. More preferably, the signal lines run between a complete extension of the DC power lines parallel to the DC power lines and/or comprise the same or a similar length of the DC power lines. The term configured for delivering electrical energy to a single electrical vehicle at the same time means, although the EVSE is provided as a so called multi-outlet system comprising a plurality of charging cables with respective charging connectors, each for connecting an electrical vehicle i.e. in sum a plurality of electrical vehicles, that at one time only of the plurality of electrical vehicles can be charged.

According to a preferred implementation of the EVSE or of the method, the signal lines are connected to the DC power lines within the respective charging connector and/or whereby at least one of the charging cables comprise no liquid cooling. This means that the signal lines are connected preferably at an utmost end of the DC power lines within the charging connector, for example integrated within the charging connector, to the DC power lines. The charging connector may comprise contact pins, at which an end of the respective signal line is connected to an end of the respective DC power line. The charging connector can be a combination of an AC connector with a DC option and is called in such case Combo Coupler, while variant with IEC Type 2 is often abbreviated as Combo2. The charging connector is also referred to as electrical connector or coupler. Thus, the term liquid cooled charging cables is to be understood by said implementation that some of the charging cable comprise liquid cooling, while at least one of the charging cables comprise no liquid cooling.

In another preferred implementation of the EVSE or of the method, in particular the EVSE comprises a single DC metering device and a plurality of metering switches, whereby each of the metering switches is configured for connecting each of the at least two signal lines of one of the charging cables to the single DC metering device. Preferably the DC metering device is provided as a certified DC metering device. As such certified devices are rather expensive, providing only a single DC metering device, which can be connected via the metering switches via the respective signal lines for measuring the different charging cables, results in a cost-effective solution. The metering switches can be provided as electromechanical switches, for example as relays, or as any other electrical or electronical switches, such as IGBTs. Preferably, the metering switches are configured, for example by means of a respective control device or by means of a mechanical component, that only the signal lines of a single charging cable, in particular of an active charging cable charging the electrical vehicle, can be connected to the DC metering device at the same time.

According to a further preferred implementation of the EVSE or of the method, in particular the EVSE comprises a plurality of charging cable switches, whereby each of the charging cable switches is configured for connecting one of the charging cables to an energy source, and each one of the metering switches is connected to each one of the charging cable switches such that each respective pair of metering switch and charging cable switch can only be switched together.

In another preferred implementation of the EVSE or of the method, the metering switches and the charging cable switches are provided as relays with same coil wire for each respective pair of metering switch and charging cable switch. Preferably each pair of metering switch and charging cable switch are provided as joint switch and/or joint relay. Such solution avoids that the wrong relay is switched, for example due to a software bug or tampering, which may lead to measuring, with the DC metering device, the wrong charging cable. In other words, combining the metering switch and charging cable switch ensures that always the right signals lines of the active charging cable are connected to the DC metering device. Such way always an accurate metering of the actual connector voltage and of the actual charging cable is provided.

According to a further preferred implementation of the EVSE or of the EVSE, the coil wire is sealed. Such implementation provides the advantage that non-tampering in case of a possible dispute can be easily proved. Thus, regulatory requirements of certification bodies can be coped with.

In another preferred implementation of the EVSE or of the method, in particular the EVSE comprises fuses arranged between the signal lines of each charging cable and the respective metering switch, and whereby the DC metering device comprises an internal resistance $R_m$ such that an energy readout of the DC metering device is ≤0.5 kilowatt-hour (kWh) if one of the fuses is blown. According to EN 60950, voltage sensing lines i.e. the signal lines require fusing as they form a limited current circuit. However, if a fuse blows voltage measurement becomes unpredictable as, for example, only one signal line is connected to the charging connector. On the other side certification bodies require a hardware-based solution which cannot be tampered. For fulfilling this requirement, the present implementation provides a low input impedance of the DC metering device, such that a blown fuse results in a low voltage readout, which in turn results in a low energy readout. Any certified software handling the energy readouts can then decide if the connector voltage respectively energy is low, for example below a threshold, so that the metering is invalid due to the blown fuse.

According to a further preferred implementation of the EVSE or of the EVSE, the internal resistance $R_m$ is ≤500 kW/($I_{max}*I_{residual}$), based on charging sessions of the electrical vehicle of 1 hour, whereby $I_{max}$ is a maximum current to be measured by the DC metering device, and $I_{residual}$ is an expected injected malicious current to the DC metering device. When a fuse is blown, any residual voltage measured by the DC metering device is influenced by resistive and capacitive malicious sources, which can be either internal or external of the DC metering device. To suppress these resistive and capacitive malicious sources, the internal resistance $R_m$ of the DC metering device is to be used in order to keep the residual voltage enough to have energy readout of less than 0.5 kWh, which is the lower value as mentioned by the NIST handbook 44. To achieve this, $R_m$ is preferably lower than the above specified 0.5 kW/($I_{max}*I_{residual}$), based on charging sessions of 1 hour, where $I_{max}$ is the maximum current to be measured by the DC metering device, and $I_{residual}$ is the expected injected malicious current. Values of $R_m$ are preferably in the range of 50 to 500 kΩ. Alternatively, said threshold could be a voltage threshold as following: if $V_{measured} < V_{expected\_minimum\_voltage}$, then fuse is regarded as blown, where $V_{expected\_minimum\_voltage}$ is the minimum voltage for Combo or CCS protocol, respectively, CHAdeMO protocol, in particular 200 V respectively 50 V.

In another preferred implementation of the EVSE or of the method, in case of the EVSE, the DC metering device is configured for or, in case of the method, with the step of comparing the measured connector voltage with a predefined threshold for determining if the fuse is blown. As described before, such comparison can advantageously be done by software handling the energy readouts, which can then decide if the connector voltage respectively energy is low, for example below a threshold, so that the metering is invalid due to the blown fuse.

According to a further preferred implementation the EVSE or the method comprises a power converter configured for connecting to a power grid and a current sensor connected to the DC metering device and arranged between the power converter and the charging cables. The current sensor is preferably arranged in the current path between the power converter and the charging cable switches. The charging cable switches and/or the DC power lines of the charging cable are preferably connected parallel to each other to the power converter. The power converter may comprise a transformer and/or a rectifier for converting electrical energy received from the power grid, for example from an AC grid, for charging the electrical vehicles.

According to a another preferred implementation the EVSE or the method comprises, in case of the EVSE, a plurality of voltage measurement devices configured to, or, in case of the method, comprising the step of measuring at an opposite end of the charging cable other than the charging connector a charger voltage of the DC power lines of the charging cable, comparing the measured charger voltage with a predefined charger voltage threshold and, if the threshold is exceeded, switching of the respective charging cable or all charging cables. If one of the charging cable switches is welded, dangerous voltages can be exposed to inactive unplugged charging connectors. Such situation can be avoided if, preferably continuously, the charger voltage is measured i.e. the voltage applied onto the DC power lines. If said charger voltage exceeds a threshold of for example 60 V for an inactive charging cable, charging is stopped.

In another preferred implementation of the EVSE or of the method, said measuring comprises the charger voltages of each of the at least two DC power lines and comprises individually comparing the measured charger voltages against each other and/or against ground for determining if the threshold is exceeded. Such way DC+ i.e. positive potential of the DC power lines can be compared against ground, DC– i.e. negative potential of the DC power lines can be compared against ground and/or DC+ can be compared against DC– if for example 60 volts (V) are exceeded.

According to another preferred implementation the EVSE or the method, the EVSE is configured for charging the electrical vehicle by using a Combined Charging System, CCS, protocol according to IEC 61851-23 and/or SAE J1772 standard and/or whereby the charging connectors and/or the charging cables are provided according to IEC 62196 standard.

The DC charging cable may comprise further conductors, such as, for example, a Proximity Pilot, PP, line for a PP signal, a Control Pilot, CP, line for a CP signal line and/or a PE line for a PE signal. PP line, CP line and/or PE line and respectively signalling are preferably implemented according to the so called Combined Charging System, CCS, protocol, in particular according to IEC 61851 or IEC 61851-23 standard. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include JAGUAR, VOLKSWAGEN, GENERAL MOTORS, BMW, DAIMLER, FORD, FCA, TESLA and HYUNDAI. The CSS standard is controlled by the so called Charging Interface Initiative (CharIN) consortium. Besides other protocols such as, for example, CHAdeMO, as abbreviation of CHArge de Move, or Guobiao recommended (GB/T), in particular according to 20234.3-2011 standard, can also be used with the described EVSE respectively the method. The EVSE and the method are applicable to different type of electrical vehicles, including for examples electrical busses. Preferably, the EVSE and/or the method is configured for charging the electrical vehicles with a DC input voltage up to 1500 V DC.

In another preferred implementation of the EVSE or of the method, the DC power lines comprise a diameter of ≥25 millimeter squared (mm²), 50 mm² or 70 mm², the signal lines comprise a diameter of ≤0.5 mm², 0.75 mm² or 1 mm² and/or the charging cables and/or the signal lines comprises a length of ≥4 meter (m), 5 m or 7.5 m and ≤5 m, 7.5 m or 10 m. For cooling the DC power lines, a cooling device can be provided, which is preferably arranged at the EVSE and/or which is configured that a cooling fluid is conveyed from a first end to a second, opposite end of the DC charging cable respectively of the DC power lines, and thereafter from the second end to the first end. The DC charging cable may comprise additional DC power lines i.e. more than two DC power lines, which could be equipped with a respective signal line. Thus, the term comprising two DC power lines is to be understood that additional DC power lines could be present as well. Preferably, the DC power lines and the signal line are encased with a cable coating and/or cable sheaths for forming the DC charging cable. Further preferably, the DC power lines and/or the signal line are insulated and/or comprise an insulating coating.

The invention further comprises an electric vehicle charging equipment, EVSE, delivering DC charging power and configured for delivering electrical energy to a single electrical vehicle at the same time, whereby the EVSE comprises a plurality of liquid cooled charging cables with respective charging connectors for connecting to a respective plurality of electrical vehicles, whereby each charging cable comprises at least two DC power lines, a single DC metering device configured for measuring in particular a connector voltage of the DC power lines, and a plurality of metering switches, whereby each of the metering switches is configured for connecting one of the charging cables at a time to the single DC metering device. Preferably, each charging cable comprises at least two signal lines, which are each connected to a respective DC power line within the charging connector, and whereby the DC metering device configured for measuring, via the at least two signal lines, the connector voltage within the charging connector.

The invention further comprises an electric vehicle charging equipment, EVSE, delivering DC charging power and configured for delivering electrical energy to a single electrical vehicle at the same time, whereby the EVSE comprises a plurality of charging cables with respective charging connectors for connecting to a respective plurality of electrical vehicles, whereby at least one of the charging cables is liquid cooled and whereby each charging cable comprising at least two DC power lines and at least two signal lines, a plurality of metering switches, whereby each of the metering switches is configured for connecting each of the at least two signal lines of one of the charging cables to a DC metering device, and a plurality of charging cable switches, whereby each of the charging cable switches is configured for connecting one of the charging cables to an energy source, whereby each one of the metering switches is connected to each one of the charging cable switches such that each respective pair of metering switch and charging cable switch are switched together.

The invention further comprises an electric vehicle charging equipment, EVSE, delivering DC charging power and configured for delivering electrical energy to a single electrical vehicle at the same time, whereby the EVSE comprises a plurality of charging cables with respective charging connectors for connecting to a respective plurality of electrical vehicles, whereby at least one of the charging cables is liquid cooled and whereby each charging cable comprises at least two DC power lines, and a DC metering device configured for measuring in particular a connector voltage of the DC power lines, whereby the DC metering device comprises an internal resistance $R_m$ such that an energy readout of the DC metering device is ≤0.5 kWh.

The invention further comprises an electric vehicle charging equipment, EVSE, delivering DC charging power and configured for delivering electrical energy to a single electrical vehicle at the same time, whereby the EVSE comprises a plurality of charging cables with respective charging connectors for connecting to a respective plurality of electrical vehicles, whereby at least one of the charging cables is liquid cooled and whereby each charging cable comprises at least two DC power lines, and a plurality of voltage measurement devices configured to measure at an opposite end of the charging cable other than the charging connector a charger voltage of the DC power lines of the charging cable, comparing the measured charger voltage with a predefined charger voltage threshold and, if the threshold is exceeded, switching of the respective charging cable or all charging cables.

Further embodiments and advantages of the method are directly and unambiguously derived by the person skilled in the art from the EVSE as described before.

FIG. 1 shows an electric vehicle charging equipment, EVSE, 1 for charging a plurality of electrical vehicles 2 with electrical energy. In the present embodiment, the EVSE 1 comprises two liquid cooled charging cables 3 with respective charging connectors 4 connected thereto. The charging cables 3 and charging connectors 4 are provided according to IEC 62196 standard, while the EVSE 1 is configured for charging the electrical vehicles 2 by using a Combined Charging System, CCS, protocol according to IEC 61851-23 and SAE J1772 standard.

The charging cables 3 each comprise a length of 5 m between its opposite ends and two DC power lines 5, one having a positive potential, depicted as DC+, and the other having a negative potential, depicted as DC−. In addition to the DC power lines 5, the charging cables 3 each comprise two signal lines 6, which run parallel to the DC power lines 5 and end within the charging connectors 4. While the DC charging conductors 5 comprise a diameter of around 50 mm², the signal lines 6 comprises a diameter of around 0.5 mm². Signal lines 6 and DC power lines 5 each comprise an insulating coating and a common cable encasing for forming the charging cables 3.

As can be seen in FIG. 1, each one signal line 6 is connected within the charging connector 4 to the end of the DC power lines 5 at contact pins of the charging connector 4. At the other end of the charging cables 3 opposite to the charging connectors 4 the signal lines 6 are each connected via fuses 7 and metering switches 8 to a single DC metering device 9. Thus, any voltage losses in the charging cable 3 are bypassed as the resulting energy actually provided within the charging connector 4 is measured via the signal lines 6 connected to the DC metering device 9.

The metering switches 8, referred to as X2 and X4 in FIG. 1, are integrated with charging cable switches 10, referred to as X1 and X3 in FIG. 1, which are arranged in the current path between the DC power lines 5 and a power converter 11, so as to switch on respectively off DC current for fueling the electrical vehicles 2. Integrated means that the metering switches 8 and the charging cable switches 10 are each provided as a single relay having the same coil wire, such that switching one of the metering switches 8 also switches the respective charging cable switch 10. The coil wire is sealed such that non-tampering after a possible disputed can be proven.

The power converter 11 comprises a transformer and/or a rectifier for receiving respectively converting electrical energy from a power grid 12, such as an alternating current (AC) grid, to be provided to the electrical vehicles 2 for charging batteries of the electrical vehicles 2.

The EVSE 1 is configured for delivering electrical energy to a single electrical vehicle 2 out of the two electrical vehicles 2 at the same time. Thus, only one of the charging cable switches 10 i.e. X1, X3 is closed at the same time for charging only one of the electrical vehicles 2. At the same time, the respective metering switch 8 i.e. X2, X4 is closed such that a connector voltage present at the respective charging connector 4 can be measured by the DC metering device 9.

The fuses 7 form a limited current circuit according to EN 60950 norm. If one of the fuses 7 blow, then energy measurement is not accurate anymore. In order to provide a hardware-based solution which cannot be tampered, the DC metering device 9 comprises a low input impedance. Thus, a blown fuse 7 results in a low voltage readout by the DC metering device 9, which in turn results in a low energy readout. A control device having a certified software installed thereon for handling the energy readouts can then decide if the energy is low e.g. below a threshold such that the metering is invalid due to the blown fuse 7.

Specifically, if a fuse 7 is blown, any residual voltage measured by the DC metering device 9 is influenced by resistive and capacitive malicious sources, which can be either internal or external of the DC metering device 9. To suppress these resistive and capacitive malicious sources, an internal resistance $R_m$ of the DC metering device 9 is to be used in order to keep the residual voltage enough to have energy readout of less than 0.5 kWh, which is the lower value as defined by NIST handbook 44. More specifically, $R_m$ is lower than 0.5 kW/($I_{max}*I_{residual}$), based on charge sessions of 1 hour for the electrical vehicles 2, where $I_{max}$ is a maximum current to be measured by the DC metering device 9, and $I_{residual}$ is an expected injected malicious current. Typical values of $R_m$ are in the range of 50 to 500 kΩ. For measuring the current, a current sensor 13 is arranged in the current path between the power converter 11 and the charging cable switches 10, and connected to the DC metering device 9.

If the DC metering device 9 respective the control device with the certified software installed thereon determines an abnormal measured connector voltage, for example by comparing the measured connector voltage with a predefined threshold, the charging cable switches 10 can switch of the charging cables 3 respectively the DC contactors 5 arranged therein and/or the power converter 11 can interrupt energy provision to the charging cable switches 10 and thereby to the electrical vehicles 2.

For determining if one of the charging cable switches 10, i.e. X2 or X4 are welded, voltage measurement devices 14 are provided at an opposite end of the charging cables 3 other than the charging connectors 4 for measuring a respective charger voltage. If the charger voltage exceeds a predefined threshold, for example 60 V DC in an inactive state of the respective charging cable switch 10, sensed of any of DC+ versus ground, DC− versus ground or DC+ versus DC−, the EVSE 1 interrupts all ongoing charging sessions, for example by shutting the power converter 11 so as to interrupt energy provision to the charging cable switches 10.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

1 Electric vehicle charging equipment, EVSE
2 Electrical vehicle
3 Charging cable
4 Charging connector
5 DC power line
6 Signal line
7 Fuse
8 Metering switch
9 DC metering device
10 Charging cable switch
11 Power converter, energy source
12 Power grid, energy source
13 Current sensor
14 Voltage measurement devices

What is claimed is:

1. An electric vehicle charging equipment (EVSE) system, wherein the EVSE system delivers direct current (DC) charging power and is configured for delivering electrical energy to a single electrical vehicle at a same time, wherein the EVSE system comprises:
    a plurality of charging cables with respective charging connectors for connecting to a respective plurality of electrical vehicles, wherein at least one of the plurality of charging cables is liquid cooled and wherein each of the plurality of charging cables comprises at least two DC power lines and at least two signal lines, which are each connected to a respective DC power line of the at least two DC power lines within the charging connector; and
    a DC metering device configured for measuring, via the at least two signal lines, a connector voltage between the at least two DC power lines within the charging connector.

2. The EVSE system according to claim 1, wherein at least one of the plurality of charging cables comprises no liquid cooling.

3. The EVSE system according to claim 1, wherein the DC metering device is a single DC metering device and the EVSE system further comprises a plurality of metering switches, wherein each of the plurality of metering switches is configured for connecting each of the at least two signal lines of one of the plurality of charging cables to the single DC metering device.

4. The EVSE system according to claim 3, wherein the EVSE system further comprises a plurality of charging cable switches, wherein each of the plurality of charging cable switches is configured for connecting one of the plurality of charging cables to an energy source, and each one of the plurality of metering switches is connected to each one of the plurality of charging cable switches such that each respective pair of metering switch and charging cable switch are switched together.

5. The EVSE system according to claim 4, wherein the plurality of metering switches and the plurality of charging cable switches are provided as relays with same coil wire for each respective pair of the metering switch and the charging cable switch.

6. The EVSE system according to claim 5, wherein the coil wire is sealed.

7. The EVSE system according to claim 5, further comprising a plurality of voltage measurement devices configured to measure, at an opposite end of the charging cable other than the charging connector, a charger voltage of the respective DC power line of the at least two DC power lines of the charging cable, comparing the measured charger voltage with a predefined charger voltage threshold, and based on the predefined charger voltage threshold being exceeded, switching of the respective charging cable or of all of the plurality of charging cables.

8. The EVSE system according to claim 7, comprising measuring the charger voltages of each of the respective DC power line of the at least two DC power lines and individually comparing the measured charger voltages against each other and/or against ground for determining whether the predefined charger voltage threshold is exceeded.

9. The EVSE system according to claim 3, further comprising fuses arranged between the at least two signal lines of each of the plurality of charging cables and a respective metering switch of the plurality of metering switches.

10. The EVSE system according to claim 9, wherein the single DC metering device comprises an internal resistance ($R_m$) such that an energy readout of the single DC metering device is ≤0.5 kilowatt-hour (kWh) based on one of the fuses being blown.

11. The EVSE system according to claim 10, wherein the internal resistance ($R_m$) is ≤500 W/($I_{max}*I_{residual}$) based on a charging session of the electrical vehicle of one hour, wherein $I_{max}$ is a maximum current to be measured by the DC metering device and $I_{residual}$ is an expected injected malicious current to the DC metering device.

12. The EVSE system according to claim 9, wherein the DC metering device is configured for comparing the measured connector voltage with a predefined threshold for determining whether a fuse of the fuses is blown.

13. The EVSE system according to claim 3, further comprising a power converter configured for connecting to a power grid and a current sensor connected to the DC metering device and arranged between the power converter and the plurality of charging cables.

14. The EVSE system according to claim 1, wherein the EVSE system is configured for charging the plurality of electrical vehicles by using a Combined Charging System (CCS) protocol according to International Electrotechnical Commission (IEC) 61851-23 and/or Society of Automotive Engineers (SAE) J1772 standard.

15. The EVSE system according to claim 14, wherein the charging connectors and/or the plurality of charging cables are provided according to IEC 62196 standard.

16. The EVSE system according to claim 1, wherein the respective DC power line of the at least two DC power lines comprises a diameter of ≥25 millimeter squared ($mm^2$), 50 $mm^2$ or 70 $mm^2$, the at least two signal lines comprises a diameter of ≤0.5 $mm^2$, 0.75 $mm^2$ or 1 $mm^2$ and/or the plurality of charging cables and/or the at least two signal lines comprise a length of ≥4 meters (m), 5 m or 7.5 m and ≤5 m, 7.5 m or 10 m.

17. A method for measuring a connector voltage at a charging connector using an electric vehicle charging equipment (EVSE) system, wherein the EVSE system delivers direct current (DC) charging power and is configured for delivering electrical energy to a single electrical vehicle at a same time, and wherein the EVSE comprises a plurality of charging cables with respective charging connectors for connecting to a respective plurality of electrical vehicles, wherein at least one of the plurality of charging cables is liquid cooled and wherein each charging cable of the plurality of charging cables comprises at least two DC power lines and at least two signal lines, which are each connected to a respective DC power line of the at least two DC power lines within the charging connector (4), and wherein the method comprises:

measuring, via the at least two signal lines, the connector voltage between the at least two DC power lines within the charging connector.

* * * * *